(12) United States Patent
Huang et al.

(10) Patent No.: US 11,262,283 B2
(45) Date of Patent: Mar. 1, 2022

(54) PARTIAL PRESSURE TOOL FOR REAL-TIME MEASUREMENT AND ADJUSTMENT OF PRESSURE AND VISCOSITY AND MEASUREMENT METHOD THEREOF

(71) Applicant: Chongqing University of Science and Technology, Chongqing (CN)

(72) Inventors: Bin Huang, Heilongjiang (CN); Cheng Fu, Heilongjiang (CN); Xinyu Hu, Heilongjiang (CN); Xiaohui Li, Heilongjiang (CN); Fajun Zhao, Heilongjiang (CN); Chunjing Lu, Heilongjiang (CN); Weiwen Zhang, Heilongjiang (CN); Xiangdong Qi, Heilongjiang (CN)

(73) Assignee: CHONGQING UNIVERSITY OF SCIENCE AND TECHNOLOGY, Chongqing (CN)

( * ) Notice: Subject to any disclaimer, the term of this patent is extended or adjusted under 35 U.S.C. 154(b) by 42 days.

(21) Appl. No.: 16/887,403

(22) Filed: May 29, 2020

(65) Prior Publication Data
US 2021/0025799 A1 Jan. 28, 2021

(30) Foreign Application Priority Data
Jul. 25, 2019 (CN) .......................... 201910678391.5

(51) Int. Cl.
*G01N 11/14* (2006.01)
(52) U.S. Cl.
CPC ........ *G01N 11/14* (2013.01); *G01N 2011/147* (2013.01); *G01N 2291/02818* (2013.01); *G01N 2291/02872* (2013.01)

(58) Field of Classification Search
CPC ............. G01N 11/14; G01N 2011/147; G01N 2291/02818; G01N 2291/02872; E21B 43/16; E21B 47/06; G01L 11/00
See application file for complete search history.

(56) References Cited

U.S. PATENT DOCUMENTS

| 2008/0135237 A1* | 6/2008 | Dubost | E21B 41/0064 |
| | | | 166/250.03 |
| 2016/0040533 A1* | 2/2016 | Harrison | E21B 49/088 |
| | | | 73/152.05 |
| 2019/0286081 A1* | 9/2019 | Frey | F01K 17/04 |

* cited by examiner

*Primary Examiner* — Suman K Nath
(74) *Attorney, Agent, or Firm* — Browdy and Neimark, PLLC

(57) ABSTRACT

A partial pressure tool for real-time measurement and adjustment of pressure and viscosity and a measurement method thereof. The partial pressure tool includes an outer cylinder and adjustable annular throttling grooves, and the adjustable annular throttling grooves are split-type grooves vertically and successively installed on an inner wall of the outer cylinder at equal intervals. Four single throttling grooves are adjacent to each other and arranged concentrically on a circumferential surface. A viscometer is installed on a surface of an arc-shaped inner plate in a tail-end adjustable annular throttling groove. The viscometer is connected to an induction board through a transmission line. The arc-shaped inner plate in the tail-end adjustable annular throttling groove is provided with a pressure sensor and a torque sensor, and the pressure sensor and the torque sensor both are connected to the induction board. The induction board is connected to a DSP control module.

6 Claims, 3 Drawing Sheets

PARTIAL PRESSURE TOOL FOR REAL-TIME MEASUREMENT AND ADJUSTMENT OF PRESSURE AND VISCOSITY AND MEASUREMENT METHOD THEREOF

TECHNICAL FIELD

The present invention relates to a partial pressure injection tool used in layered injection in the process of oil field development and production, and particularly relates to a partial pressure tool for real-time measurement and adjustment of pressure and viscosity and a measurement method thereof.

BACKGROUND

Chemical flooding technologies such as polymer flooding are mainly used in cases with strong heterogeneity of oil layers, multiple layers, and large inter-layer differences. When a conventional injection method is adopted, flooding fluid will burst along a high-permeability layer, so that a low-permeability layer has low utilization and the overall oil displacement effect is reduced. The layered injection process can alleviate inter-layer contradiction, improve an injection profile, and improve the overall development effect. This mainly depends on throttling elements in a partial pressure injection tool. Conventional throttling elements mainly include an annular pressure reducing groove structure, a spiral pipe structure, and an elongated pipe structure; and the annular pressure reducing groove structure is most widely used. Its working principle is that when alkali/surfactant/polymer (ASP) solution flows through the pressure reducing groove, the flow pattern and flow field distribution are changed periodically due to the periodic decrease or increase of an overflowing area, resulting in energy loss, thereby forming a throttling pressure difference, and finally achieving the adjustment of pressure.

The conventional partial pressure injection tool has a limited pressure adjustment range. When a certain value of the throttling pressure difference is achieved, only one type of partial pressure injection tool with a determined structure can be used, and structural parameters cannot be adjusted; and a partial pressure tool with same structural parameters is not suitable for all pressure adjustment situations. At this time, the partial pressure injection tool will cause a certain viscosity loss when the pressure is adjusted. The viscosity loss caused by the partial pressure tool with different forms and structural parameters is also related to main parameters of the layered injection process. The conventional partial pressure injection tool cannot measure changes in pressure and viscosity of the solution when it flows through the tool, accurately and timely grasp the rheolytic state of the solution flowing through the partial pressure injection tool, or timely understand the effect of the tool. Therefore, it is required to explore a partial pressure injection tool that is applicable to various scenarios, can measure pressure and viscosity, and can change the mechanical structure of the throttling groove from a structure and effects different from the conventional partial pressure injection tool.

SUMMARY

An objective of the present invention is to provide a partial pressure tool for real-time measurement and adjustment of pressure and viscosity. The present invention can solve the problem that the structure of an existing partial pressure injection tool cannot be adjusted and the pressure and viscosity of the solution flowing through the partial pressure injection tool cannot be measured. Another objective of the present invention is to provide a measurement method of the partial pressure tool for real-time measurement and adjustment of pressure and viscosity.

The technical solution used by the present invention to solve its technical problems is as follows: A partial pressure tool for real-time measurement and adjustment of pressure and viscosity includes an outer cylinder, adjustable annular throttling grooves, a viscometer, a pressure sensor, a current sensor, a torque sensor, an induction panel, a DSP control module, and a computer. The adjustable annular throttling grooves are split-type grooves vertically and successively installed on an inner wall of the outer cylinder at equal intervals. Single throttling grooves are arc-shaped, and four single throttling grooves are adjacent to each other and arranged concentrically on a circumferential surface, to form the adjustable annular throttling grooves. Each single throttling groove includes an arc-shaped inner plate, a periphery of the arc-shaped inner plate is connected to the inner wall of the outer cylinder respectively through a trapezoidal retractable side plate, to form a closed retractable housing. Four arc-shaped inner plates are adjacent to each other to form a hollow cylinder. Each arc-shaped inner plate is connected to the outer cylinder through a telescopic cylinder and a pull rod, the pull rod is located inside the telescopic cylinder, an outer end of the pull rod protrudes from the outer cylinder and is fixed with an adjusting knob, the trapezoidal retractable side plate is composed of a trapezoidal telescopic frame and a trapezoidal plate, and the trapezoidal plate and the trapezoidal telescopic frame are slidably connected. A viscometer is installed on a surface of the arc-shaped inner plate in a tail-end adjustable annular throttling groove, the viscometer is connected to the induction board through a transmission line, the induction board is provided with a microprocessor converter and a signal receiver, the arc-shaped inner plate in the tail-end adjustable annular throttling groove is provided with the pressure sensor and the torque sensor, the pressure sensor and the torque sensor both are connected to the induction board, the induction board is connected to the DSP control module, and the DSP control module is connected to the computer.

In the above solution, the viscometer is a spontaneous viscometer, and the spontaneous viscometer is composed of a rotor, miniature blades, an induction shaft, and magnetic plates. The rotor is installed on the induction shaft, there are miniature blades outside the rotor, two ends of the induction shaft are connected to the magnetic plates, and the induction shaft is respectively connected to the induction board, the current sensor, and the torque sensor through the transmission line.

In the above solution, there are five adjustable annular throttling grooves.

In the above solution, the telescopic cylinder is composed of three hollow cylinders slidably connected to each other.

In the above solution, the outer cylinder has an inner diameter of 40 mm and an outer diameter of 52 mm, a space between two adjacent annular throttling grooves is 10 mm, and an angle between the trapezoidal retractable side plate and the outer cylinder is 60°. A volume of a hollow space where the rotor is located is 8×3×2 mm, the rotor is suspended from the hollow space through the induction shaft, and a diameter of the rotor is 2 mm.

A measurement method of the partial pressure tool for real-time measurement and adjustment of pressure and viscosity is as follows.

First, a size of the annular throttling groove is adjusted to control a gap at which the solution flows through the annular throttling groove, and specific operating steps are as follows:

Step 1: the size of the to-be-adjusted annular throttling groove is determined according to a throttling pressure difference required for operation requirements;

Step 2: a distance to be extended or contracted by the telescopic cylinder is obtained according to the size of the to-be-adjusted annular throttling groove;

Step 3: the telescopic cylinder is controlled by turning the adjusting knob to adjust extension or contraction amount of the telescopic cylinder; and Step 4: the arc-shaped inner plate is connected to the telescopic cylinder, the telescopic cylinder drives the arc-shaped inner plate to move; when the telescopic cylinder is extended, the trapezoidal plate of the annular throttling groove is extended, the inner diameter of the hollow cylinder becomes smaller, and the gap at which the solution flows becomes smaller; and when the telescopic bracket is contracted, the trapezoidal plate of the annular throttling groove is contracted, the inner diameter of the hollow cylinder becomes larger, and the gap at which the solution flows becomes larger.

Then, measurement is performed, and specific operating steps are as follows:

Step 1: when the solution flows through a fifth annular throttling groove, the solution comes into contact with the miniature blades on the rotor, and the flowing solution causes an impact on the miniature blades, generates an acting force, and drives the rotor to rotate stably at a rotating speed w;

Step 2: the magnetic plates on both sides of the induction shaft form a magnetic field, rotated rotor performs magnetic line cutting motion and generates a current I, and the current transmits an electronic signal to the current sensor through a signal receiver on the induction board;

step 3: the induction shaft is connected to the signal receiver and the microprocessor converter on the induction board through the transmission line, information of the rotating speed w, the generated current I, and generated torque M of the rotor is transmitted to the DSP control module for information collection and processing through the current sensor and the torque sensor;

Step 4: a torque calculation model is established according to the recorded rotating speed, torque and current:

$$M=c(I, w)$$

where c is a relational expression of the torque M, the current I, and the rotating speed $\omega$; and a viscosity calculation model is obtained according to a viscosity derivation formula and the torque calculation model:

$$\eta=Kc(I, w)$$

where $\eta$ is the viscosity of a measured fluid and K is a constant coefficient.

The information is summarized and compiled in the DSP control module according to the viscosity calculation model, and the DSP control module transmits the information to the computer through its signal transmitter to obtain a viscosity.

The present invention has the following beneficial effects:

1. Compared with the conventional partial pressure tool with a fixed mechanical structure, the present invention can adjust the annular throttling groove. The size of the annular throttling groove is changed by adjusting the extension and contraction amount of the arc-shaped inner plate driven by the pull rod, to change the gap at which the solution flows and to control the throttling pressure difference of the solution. The technical problem that the conventional partial pressure tool cannot change the mechanical structure of the throttling groove to change different throttling pressure differences of the solution is solved. According to a throttling pressure difference required for different requirements, based on the premise of not replacing the partial pressure tool, the throttling pressure difference is changed by changing the annular throttling groove of the tool, so as to adjust the pressure of the solution and change the viscosity of the solution. Therefore, a partial pressure tool can meet different actual needs, realize the reuse of tools, and save a lot of cost and time in replacing the tool.

2. The present invention can measure data in real time, and specifically can measure pressure and viscosity data in real time:

(1) The present invention can measure pressure data in real time. The conventional layered injection tool can only reduce the pressure of the solution, but cannot know the specific value of the pressure of the solution in the tool. The present invention transmits pressure information through a pressure sensor installed in a fifth annular throttling groove, and realizes real-time measurement of pressure data.

(2) The present invention can measure viscosity data in real time. Compared with the conventional partial pressure tool, the present invention can measure the viscosity of the solution flowing through the tool, and is different from a conventional viscosity measuring tool. The tool can convert kinetic energy generated by the solution into electric energy of a viscometer, can generate electricity by itself, reduce energy loss, and transmit viscosity information through the DSP control module to realize the real-time measurement of viscosity.

3. The present invention has simple operation, high degree of automation and networking, and strong controllability. Information can be collected and fed back in real time.

In the figures: 1. outer cylinder; 2. adjustable annular throttling groove; 3. trapezoidal retractable side plate; 4. telescopic cylinder; 5. induction board; 6. pressure sensor; 7. rotor; 8. miniature blade; 9. induction shaft; 10. magnetic plate; 11. DSP control module; 12. signal receiver; 13. current sensor; 14. torque sensor; 15. adjusting knob; 16. transmission line; 17. pull rod; 18. arc-shaped inner plate; 19. trapezoidal plate; 20. trapezoidal telescopic frame.

DETAILED DESCRIPTION

The following describes the present invention in detail with reference to the accompanying drawings.

Figure 1:
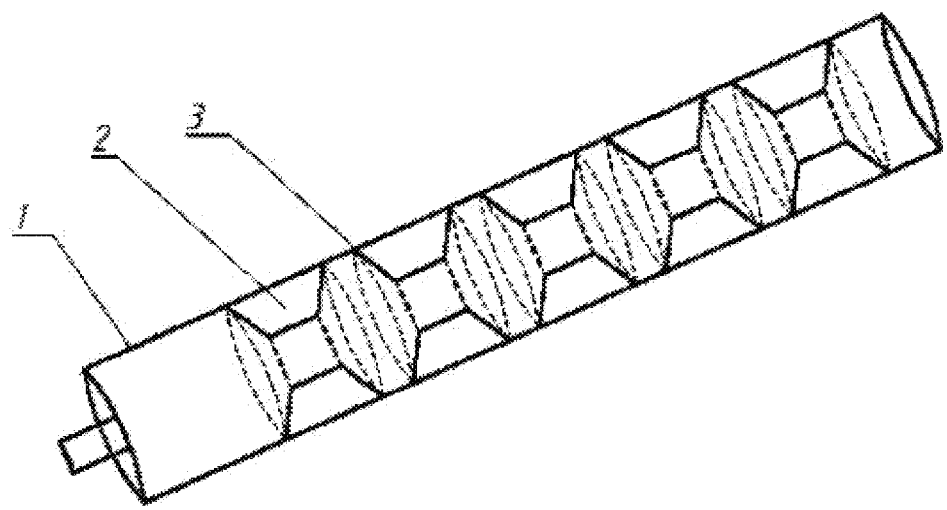
FIG. 1 is a schematic diagram of a three dimensional structure of the present invention.
Figure 2:
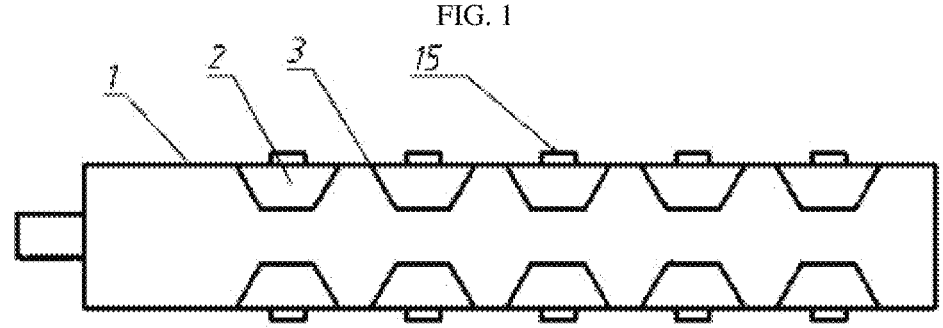
FIG. 2 is a schematic diagram of a horizontal cross section of the present invention.
Figure 3:
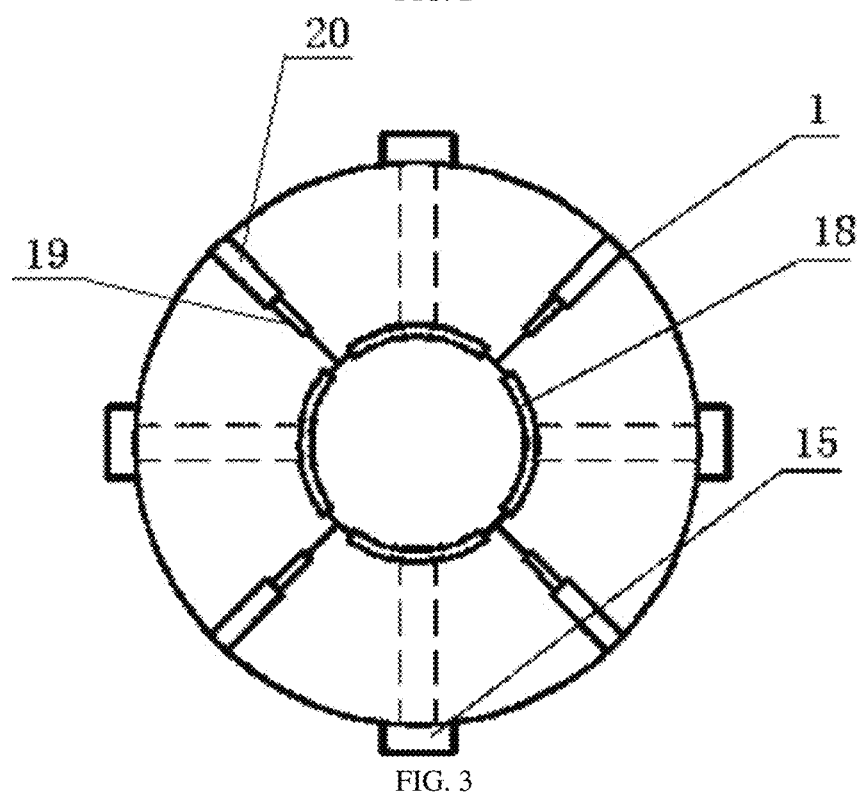
FIG. 3 is a schematic diagram of a longitudinal cross section of the present invention.
Figure 4:
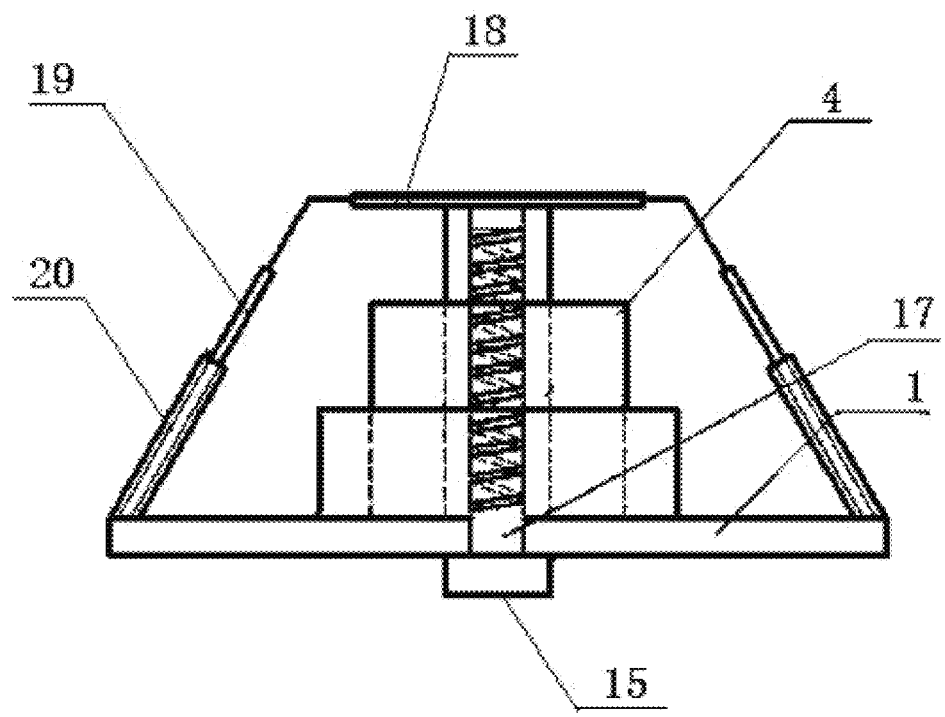
FIG. 4 is a schematic diagram of an internal structural cross section of an annular throttling groove of the present invention.
Figure 5:
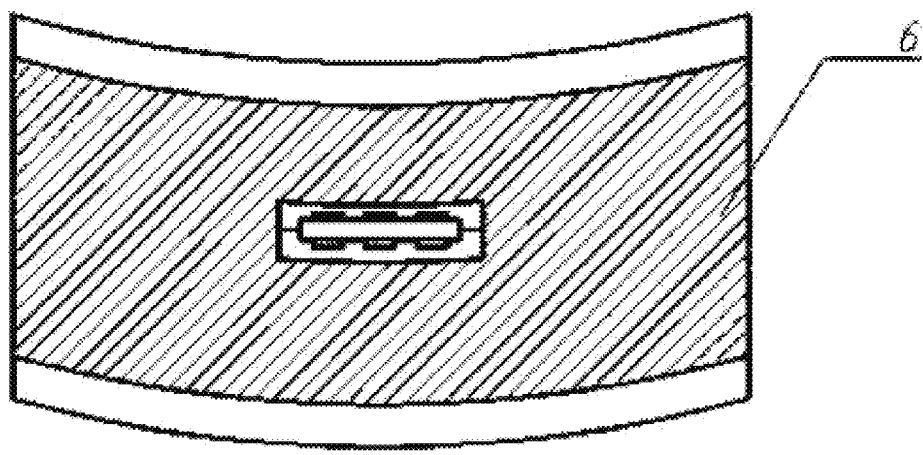
FIG. 5 is a schematic diagram of a top structure of a fifth annular throttling groove of the present invention.
Figure 6:
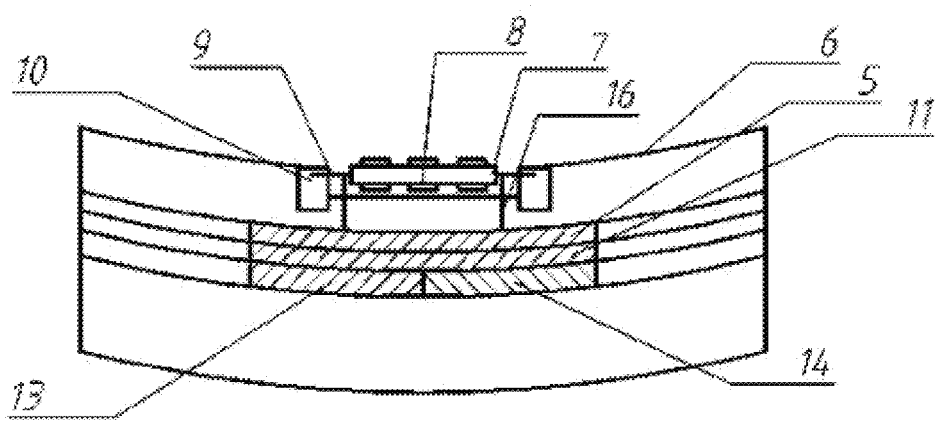
FIG. 6 is a schematic diagram of a spontaneous viscometer of the present invention.
Figure 7:
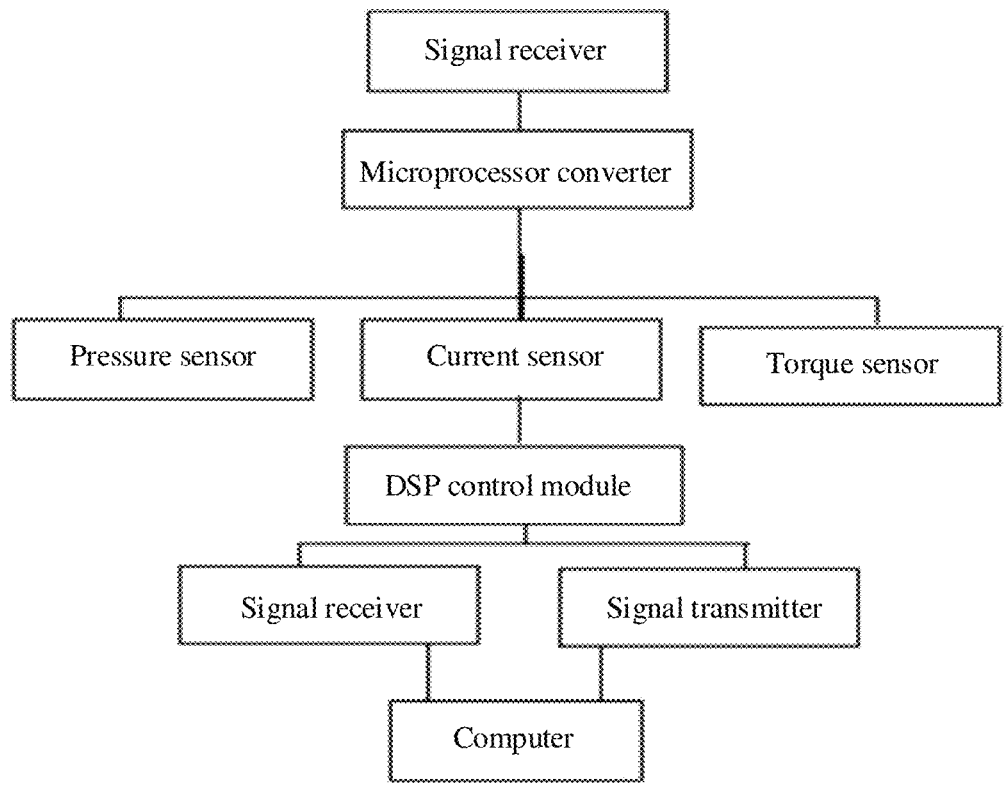
FIG. 7 is a working flow chart of viscosity measurement and pressure measurement of the present invention.
Figure 8:
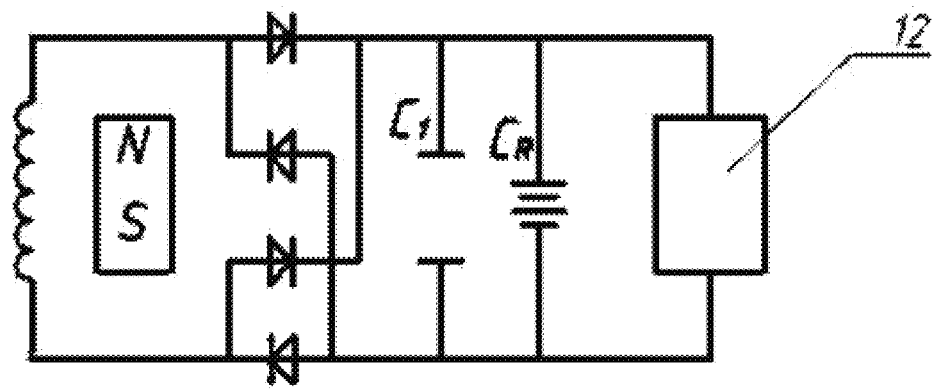
FIG. 8 is a circuit diagram of a self-generating flow of a spontaneous viscometer of the present invention.

As shown in FIG. 1, FIG. 2, and FIG. 3, the partial pressure tool for real-time measurement and adjustment of pressure and viscosity includes an outer cylinder 1, adjustable annular throttling grooves 2, a viscometer, a pressure sensor 6, a current sensor 13, a torque sensor 14, an induction board 5, a DSP control module 11, and a computer. Five annular throttling grooves 2 are vertically and successively installed on an inner wall of the outer cylinder 1 at equal intervals. When the solution flows through the annular throttling groove 2, the annular throttling groove acts as a throttling tool to reduce the pressure of the solution. A spontaneous viscometer, a pressure sensor 6, and a torque sensor 14 are installed on a fifth annular throttling groove 2. The spontaneous viscometer is connected to the induction board 5 through a transmission line 16, and the induction board 5 is provided with a microprocessor converter and a receiving transmitter. The pressure sensor 6 and the torque sensor 14 both are connected to the induction board 5, the induction board 5 is connected to the DSP control module 11, and the DSP control module 11 is connected to the computer. These tools can record changes in viscosity and pressure of the solution, and then transmit the information to the computer through a signal transmitter to obtain specific values.

The adjustable annular throttling grooves 2 are split type, single throttling grooves are arc-shaped, and four single throttling grooves are adjacent to each other and arranged concentrically on a circumferential surface, to form the adjustable annular throttling grooves 2. Each single throttling groove includes an arc-shaped inner plate 18, a periphery of the arc-shaped inner plate 18 is connected to the inner wall of the outer cylinder 1 respectively through a trapezoidal retractable side plate 3, to form a closed retractable housing, and four arc-shaped inner plates 18 are adjacent to each other to form a hollow cylinder. Each arc-shaped inner plate 18 is connected to the outer cylinder 1 through a telescopic cylinder 4 and a pull rod 17, the pull rod 17 is located inside the telescopic cylinder 4, an outer end of the pull rod 17 protrudes from the outer cylinder 1 and is fixed with an adjusting knob 15, the trapezoidal retractable side plate 3 is composed of a trapezoidal telescopic frame 20 and a trapezoidal plate 19, and the trapezoidal plate 19 and the trapezoidal telescopic frame 20 are slidably connected. The telescopic cylinder 4 is composed of three hollow cylinders slidably connected to each other.

The cross-section of each annular throttling groove 2 is trapezoidal, and the arc-shaped inner plate 18 is connected to the telescopic cylinder 4. The amount of expansion and contraction of the telescopic cylinder 4 is controlled by manually adjusting the knob 15, so as to drive the arc-shaped inner plate 18 to extend or contract and adjust the size of the annular throttling groove 2, and the control of the gap of the solution flowing through the annular throttling groove 2 is achieved. The specific operation steps are as follows:

Step 1: the size of the to-be-adjusted annular throttling groove 2 is determined according to a throttling pressure difference required for operation requirements;

Step 2: a distance to be extended or contracted by the telescopic cylinder 4 is obtained according to the size of the to-be-adjusted annular throttling groove 2;

Step 3: the telescopic cylinder 4 is controlled by turning the adjusting knob 15 to adjust extension or contraction amount of the telescopic cylinder 4; and Step 4: the arc-shaped inner plate 18 is connected to the telescopic cylinder 4, the telescopic cylinder 4 drives the arc-shaped inner plate 18 to move; when the telescopic cylinder 4 is extended, the trapezoidal plate 19 of the annular throttling groove 2 is extended, the inner diameter of the hollow cylinder becomes smaller, and the gap at which the solution flows becomes smaller; and when the telescopic bracket is contracted, the trapezoidal plate 19 of the annular throttling groove 2 is contracted, the inner diameter of the hollow cylinder becomes larger, and the gap at which the solution flows becomes larger.

In the present invention, a spontaneous viscometer is installed at each of the upper and lower surfaces of the adjustable annular throttling groove 2 to measure the viscosity of the solution. The viscometer is a spontaneous viscometer and is composed of a rotor 7, miniature blades 8, an induction shaft 9, and magnetic plates 10. The rotor 7 is installed on the induction shaft 9, there are miniature blades 8 outside the rotor 7, two ends of the induction shaft 9 are connected to the magnetic plates 10, the induction shaft 9 is respectively connected to the induction board 5, the current sensor 13, and the torque sensor 14 through the transmission line 16, and is finally connected to the DSP control module 11 for transmitting or receiving signals. The specific steps for measuring the viscosity are as follows:

Step 1: when the solution flows through a fifth annular throttling groove 2, the solution comes into contact with the miniature blades 8 on the rotor 7, and the flowing solution causes an impact on the miniature blades 8, generates an acting force, and drives the rotor 7 to rotate stably at a rotating speed w;

Step 2: the magnetic plates 10 on both sides of the induction shaft 9 form a magnetic field, rotated rotor 7 performs magnetic line cutting motion and generates a current I, and the current flows through the signal receiver 12 on the induction board 5 to transmit an electronic signal to the current sensor 13;

Step 3: the induction shaft 9 is connected to the signal receiver 12 and the microprocessor converter on the induction board 5 through the transmission line 16, information of the rotating speed w, the generated current I, and generated torque M of the rotor 7 is transmitted to the DSP control module 11 for information collection and processing through the current sensor 13 and the torque sensor 14;

Step 4: a torque calculation model is established according to the recorded rotating speed, torque and current:

$$M=c(I, w)$$

where c is a relational expression of the torque M, the current I, and the rotating speed $\omega$; and a viscosity calculation model is obtained according to a viscosity derivation formula and the torque calculation model:

$$\eta=Kc(I, w)$$

where $\eta$ is the viscosity of a measured fluid and K is a constant coefficient; and Step 5: an average viscosity formula is obtained by averaging the obtained viscosities of the upper and lower surfaces according to the torque calculation model and the viscosity calculation model:

$$\eta_c=0.5(\eta_1+\eta_2)$$

The information is summarized and compiled in the DSP control module according to an average viscosity formula, and the DSP control module transmits the information to the computer through its signal transmitter to obtain a viscosity.

In the present invention, the outer cylinder 1 has an inner diameter of 40 mm and an outer diameter of 52 mm, and a space between two adjacent annular throttling grooves 2 is 10 mm. An angle between the trapezoidal retractable side plate 3 and the outer cylinder 1 is 60°, and a volume of a hollow space where the rotor 7 is located is 8×3×2 mm The rotor 7 is suspended from the hollow space through the induction shaft 9, a diameter of the rotor 7 is 2 mm, and the sensor is tightly connected to a connection portion.

The present invention can change the corresponding mechanical structure according to actual situations, and can grasp the value of pressure and viscosity when the solution flows through the tool in real time to meet the needs of different situations.

What is claimed is:

1. A partial pressure tool for real-time measurement and adjustment of pressure and viscosity, comprising an outer cylinder (1), adjustable annular throttling grooves (2), a viscometer, a pressure sensor (6), a current sensor (13), a torque sensor (14), an induction board (5), a DSP control module (11), and a computer, wherein the adjustable annular throttling grooves (2) are split-type grooves vertically and successively installed on an inner wall of the outer cylinder (1) at equal intervals, single throttling grooves are arc-shaped, and four single throttling grooves are adjacent to each other and arranged concentrically on a circumferential surface, to form the adjustable annular throttling grooves (2); each single throttling groove comprises an arc-shaped inner plate (18), a periphery of the arc-shaped inner plate (18) is connected to the inner wall of the outer cylinder (1) respectively through a trapezoidal retractable side plate (3), to form a closed retractable housing, and four arc-shaped inner plates (18) are adjacent to each other to form a hollow cylinder; each arc-shaped inner plate (18) is connected to the outer cylinder (1) through a telescopic cylinder (4) and a pull rod (17), the pull rod (17) is located inside the telescopic cylinder (4), an outer end of the pull rod (17) protrudes from the outer cylinder (1) and is fixed with an adjusting knob (15), the trapezoidal retractable side plate (3) is composed of a trapezoidal telescopic frame (20) and a trapezoidal plate (19), and the trapezoidal plate (19) and the trapezoidal telescopic frame (20) are slidably connected; and a viscometer is installed on a surface of the arc-shaped inner plate (18) in a tail-end adjustable annular throttling groove (2), the viscometer is connected to the induction board (5) through a transmission line (16), the induction board (5) is provided with a microprocessor converter and a signal receiver (12), the arc-shaped inner plate (18) in the tail-end adjustable annular throttling groove (2) is provided with the pressure sensor (6) and the torque sensor (14), the pressure sensor (6) and the torque sensor (14) both are connected to the induction board (5), the induction board (5) is connected to the DSP control module (11), and the DSP control module (11) is connected to the computer.

2. The partial pressure tool for real-time measurement and adjustment of pressure and viscosity according to claim 1, wherein the viscometer is a spontaneous viscometer, the spontaneous viscometer is composed of a rotor (7), miniature blades (8), an induction shaft (9), and magnetic plates (10), the rotor (7) is installed on the induction shaft (9), there are miniature blades (8) outside the rotor (7), two ends of the induction shaft (9) are connected to the magnetic plates (10), the induction shaft (9) is respectively connected to the induction board (5), the current sensor (13), and the torque sensor (14) through the transmission line (16).

3. The partial pressure tool for real-time measurement and adjustment of pressure and viscosity according to claim 2, wherein there are five adjustable annular throttling grooves (2).

4. The partial pressure tool for real-time measurement and adjustment of pressure and viscosity according to claim 3, wherein the telescopic cylinder (4) is composed of three hollow cylinders slidably connected to each other.

5. The partial pressure tool for real-time measurement and adjustment of pressure and viscosity according to claim 4, wherein the outer cylinder (1) has an inner diameter of 40 mm and an outer diameter of 52 mm, a space between two adjacent adjustable annular throttling grooves (2) is 10 mm, an angle between the trapezoidal retractable side plate (3) and the outer cylinder (1) is 60°, a volume of a hollow space where the rotor (7) is located is 8×3×2 mm, the rotor (7) is suspended from the hollow space through the induction shaft (9), and a diameter of the rotor (7) is 2 mm.

6. The partial pressure tool for real-time measurement and adjustment of pressure and viscosity according to claim 3, wherein First, a size of the adjustable annular throttling groove (2) is adjusted to control a gap at which the solution flows through the adjustable annular throttling groove (2), and specific operating steps are as follows:

Step 1: the size of the adjustable annular throttling groove (2) is determined according to a throttling pressure difference required for operation requirements;

Step 2: a distance to be extended or contracted by the telescopic cylinder (4) is obtained according to the size of the adjustable annular throttling groove (2);

Step 3: the telescopic cylinder (4) is controlled by turning the adjusting knob (15) to adjust extension or contraction amount of the telescopic cylinder (4); and Step 4: the arc-shaped inner plate (18) is connected to the telescopic cylinder (4), the telescopic cylinder (4) drives the arc-shaped inner plate (18) to move; when the telescopic cylinder (4) is extended, the trapezoidal plate (19) of the adjustable annular throttling groove (2) is extended, the inner diameter of the hollow cylinder becomes smaller, and the gap at which the solution flows becomes smaller; and when the telescopic bracket is contracted, the trapezoidal plate (19) of the adjustable annular throttling groove (2) is contracted, the inner diameter of the hollow cylinder becomes larger, and the gap at which the solution flows becomes larger; and then, measurement is performed, and specific operating steps are as follows:

Step 1: when the solution flows through a fifth adjustable annular throttling groove (2), the solution comes into contact with the miniature blades (8) on the rotor (7), and the flowing solution causes an impact on the miniature blades (8), generates an acting force, and drives the rotor (7) to rotate stably at a rotating speed w;

Step 2: the magnetic plates (10) on both sides of the induction shaft (9) form a magnetic field, rotated rotor (7) performs magnetic line cutting motion and generates a current I, and the current flows through the signal receiver (12) to transmit an electronic signal to the current sensor (13);

Step 3: the induction shaft (9) is connected to the signal receiver (12) and the microprocessor converter on the induction board (5) through the transmission line (16), information of the rotating speed w, the generated current I, and generated torque M of the rotor (7) is transmitted to the DSP control module (11) for information collection and processing through the current sensor (13) and the torque sensor (6);

Step 4: a torque calculation model is established according to the recorded rotating speed, torque and current:

$$M = c(I, w)$$

wherein c is a relational expression of the torque M, the current I, and the rotating speed $\omega$; and a viscosity calculation model is obtained according to a viscosity derivation formula and the torque calculation model:

$$\eta = Kc(I, w)$$

wherein $\eta$ is the viscosity of a measured fluid and K is a constant coefficient;

Step 5: an average viscosity formula is obtained by averaging the obtained viscosities of the upper and lower surfaces according to the torque calculation model and the viscosity calculation model:

$$\eta_c = 0.50(\eta_1 + \eta_2)$$

The information is summarized and compiled in the DSP control module according to an average viscosity formula, and the DSP control module transmits the information to the computer through its signal transmitter to obtain a viscosity.

\* \* \* \* \*